(12) United States Patent
Mortensen

(10) Patent No.: US 10,884,332 B2
(45) Date of Patent: Jan. 5, 2021

(54) FILM POSITIONING DEVICES AND METHODS

(71) Applicant: John Robert Mortensen, Green Bay, WI (US)

(72) Inventor: John Robert Mortensen, Green Bay, WI (US)

( * ) Notice: Subject to any disclaimer, the term of this patent is extended or adjusted under 35 U.S.C. 154(b) by 60 days.

(21) Appl. No.: 16/452,697

(22) Filed: Jun. 26, 2019

(65) Prior Publication Data

US 2020/0081320 A1 Mar. 12, 2020

Related U.S. Application Data

(60) Provisional application No. 62/728,383, filed on Sep. 7, 2018.

(51) Int. Cl.
*G03B 27/32* (2006.01)
*G03B 1/12* (2006.01)
*G03B 17/38* (2006.01)

(52) U.S. Cl.
CPC ............ *G03B 27/323* (2013.01); *G03B 1/12* (2013.01); *G03B 17/38* (2013.01)

(58) Field of Classification Search
CPC .................................................. G03B 1/42–54
See application file for complete search history.

(56) References Cited

U.S. PATENT DOCUMENTS

| | | | |
|---|---|---|---|
| 5,430,477 A * | 7/1995 | Bachmann | G03B 1/48 348/96 |
| 5,717,975 A * | 2/1998 | Takahashi | G03B 27/462 355/1 |
| 5,886,772 A * | 3/1999 | Inatome | G03B 1/48 352/225 |
| 5,926,289 A * | 7/1999 | Brandestini | H04N 1/0057 353/103 |
| 6,757,007 B1 * | 6/2004 | Su | H04N 5/2254 348/370 |
| 7,661,672 B2 * | 2/2010 | Tenbrock | G03B 1/24 271/11 |
| 9,661,236 B2 * | 5/2017 | Howell | H04N 1/19594 |
| 2007/0122135 A1 * | 5/2007 | Speggiorin | G03B 17/38 396/56 |
| 2011/0063600 A1 * | 3/2011 | Wang | G03B 27/62 355/75 |

OTHER PUBLICATIONS

Hietala ("The 8mm film scanner (Telecine) project" parts 1-5, published from Dec. 11, 2015 through Feb. 21, 2016 on sabulo.com) (Year: 2016).*

* cited by examiner

*Primary Examiner* — Clayton E. LaBalle
*Assistant Examiner* — Leon W Rhodes, Jr.
(74) *Attorney, Agent, or Firm* — Fredrikson & Byron, P.A.

(57) ABSTRACT

A film positioning device can include a housing, a feed mechanism, and a controller. The housing defines a film receptacle. The feed mechanism is positioned at the film receptacle and configured to move film along the film receptacle. The controller is coupled to the feed mechanism. The controller is configured to control the feed mechanism to move film along the film receptacle. And, based on control of the feed mechanism, the controller is configured to output a camera actuation signal to cause a camera to capture an image of the film.

20 Claims, 8 Drawing Sheets

FILM POSITIONING DEVICES AND METHODS

RELATED APPLICATION

This application claims the benefit of U.S. Provisional Application No. 62/728,383 filed Sep. 7, 2018, the contents of which are hereby incorporated by reference.

TECHNICAL FIELD

This disclosure generally relates to devices and methods for positioning film. More specifically, this disclosure describes embodiments of devices and methods for feeding film through, and positioning film at, a device and correspondingly triggering a camera actuation signal so that an image of the film can be captured.

BACKGROUND

Film has been used over time as a means to document historical information. However, with the advent of digital technology, it has become desirable to digitally capture the historical information documented by film. Generally, to do so, a digital camera is used to capture images of the film and these images can then be stored in an electronic database and/or electronically transferred.

However, currently the process for capturing images of the film using a digital camera requires that the film be placed by hand at an appropriate position relative to the camera. This process of manual placement of the film relative to the camera is then tediously repeated for each frame of film that is to be captured. As such, when large volumes of film are desired to be imaged by the camera, the process can be exceedingly time consuming and burdensome. This process may, in turn, act to deter the preservation of historical information.

SUMMARY

In general, various exemplary embodiments relating to film positioning devices and methods are disclosed herein. Embodiments disclosed herein can act to feed and position film relative to a camera while coordinating image capture by the camera with the feeding and positioning of the film. As such, embodiments disclosed herein can provide rapid, coordinated film feeding and image triggering in a manner that can allow for images of the film to be captured in a quick and efficient manner, thereby reducing user burden and, at the same time, increasing the volume of film that can be captured. As a result, the ability to capture information documented in film can be greatly improved.

For example, certain embodiments within the scope of the present disclosure can coordinate movement and positioning of film with the generation of a camera actuation signal. Such embodiments can use a feed mechanism to move and position film at an appropriate location relative to a location at which a camera can be secured and use control of the feed mechanism to output a camera actuation signal. In this way, the movement and camera actuation signal may be automated, thereby significantly reducing the time required to capture images of large volumes of film.

One embodiment includes a film positioning device. This film positioning device includes a housing, a feed mechanism, and a controller. The housing defines a film receptacle. The feed mechanism is positioned at the film receptacle and configured to move film along the film receptacle. The controller is coupled to the feed mechanism. The controller is configured to control the feed mechanism to move film along the film receptacle. And, based on control of the feed mechanism, the controller is configured to output a camera actuation signal to cause a camera to capture an image of the film.

Another embodiment includes a method of positioning film. This method embodiment includes the step of placing an end of film at a film receptacle defined by a film positioning device housing. This step can include positioning the film at a feed mechanism that is located at the film receptacle. In some cases, this step can include positioning the end of the film between two film contact elements of the feed mechanism. The method can also include the step of moving film along the film receptacle using the feed mechanism. As one example, this step could include rotatable driving the two film contact elements. The method can further include the step of stopping movement of the film at the film receptacle. As one example, this step could include using a predetermined degree of movement driven by the feed mechanism and/or detection of the film by a film presence sensor at the housing. The method can additionally include the step of generating a camera actuation signal in coordination with (e.g., based on) control of the feed mechanism. For instance, generating the camera actuation signal in coordination with control of the feed mechanism can include using feed mechanism related input at a controller to generate the camera actuation signal.

BRIEF DESCRIPTION OF DRAWINGS

The following drawings are illustrative of particular examples of the present invention and therefore do not limit the scope of the invention. The drawings are intended for use in conjunction with the explanations in the following detailed description where like numerals refer to like features. Examples of the present invention will hereinafter be described in conjunction with the appended drawings.

FIG. 1A is a perspective view of the embodiment of the film positioning device, and FIG. 1B is an exploded view of the embodiment of the film positioning device.

FIG. 3A is a side elevational view showing the feed mechanism at the film positioning device, and FIG. 3B is a cross-sectional view, taken along line A-A in FIG. 3A, showing the feed mechanism at the film positioning device.

DETAILED DESCRIPTION

The details of one or more examples are set forth in the accompanying drawings and the description below where like numerals refer to like features. Other features, objects, and advantages will be apparent from the description and drawings, and from the listing of exemplary embodiments. The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1A:
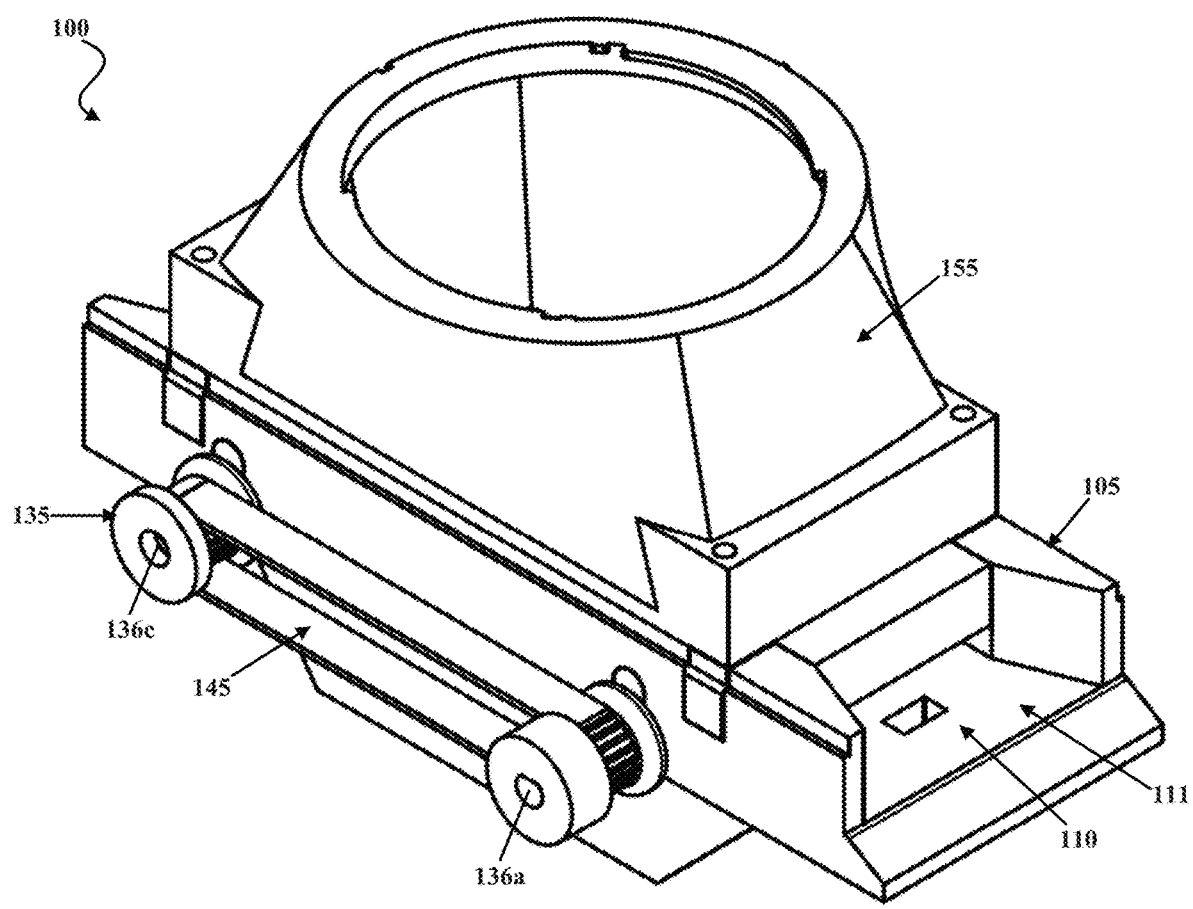
FIGS. 1A and 1B show one embodiment of a film positioning device.
Figure 1B:
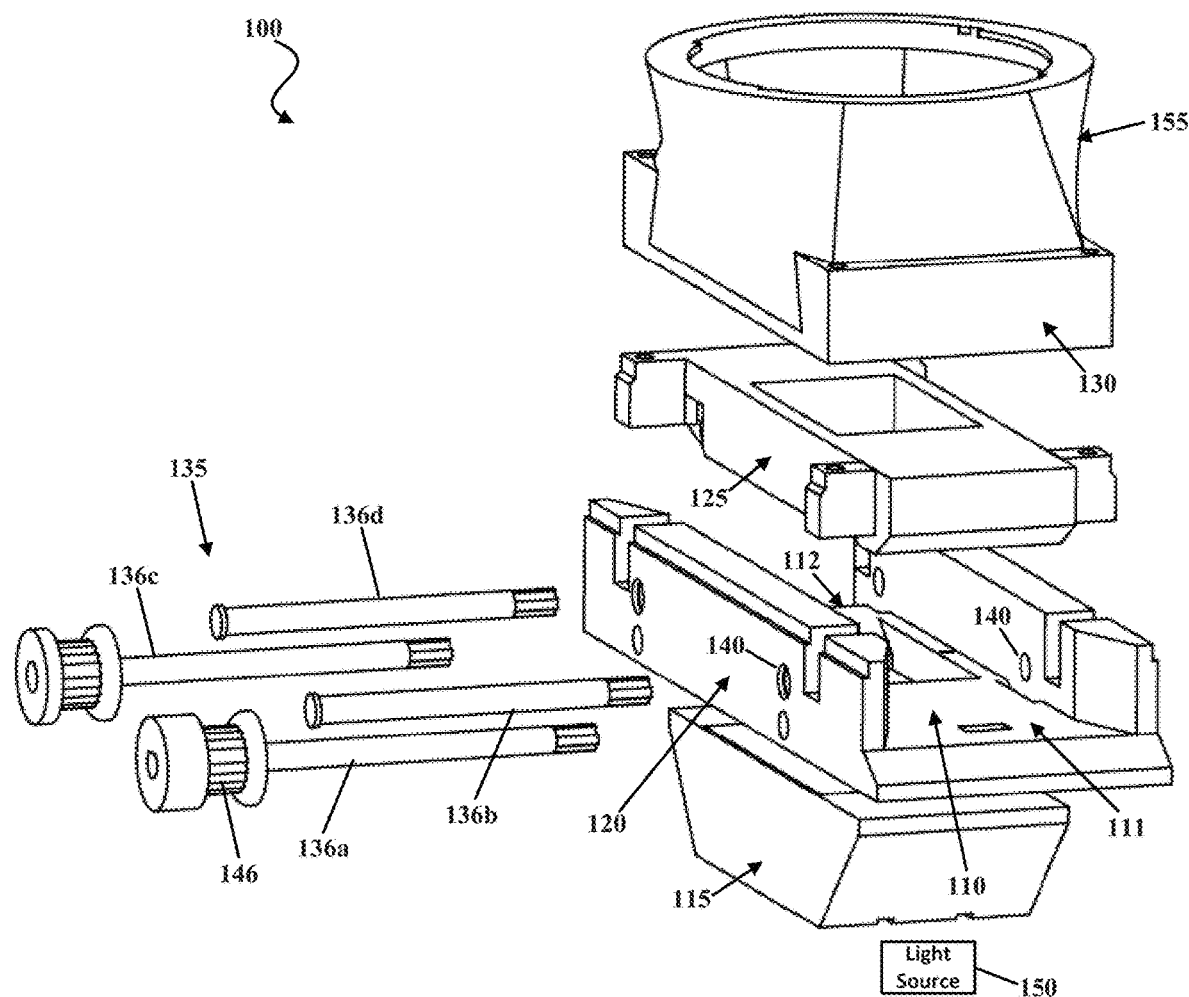

FIGS. 1A and 1B show an embodiment of a film positioning device 100. FIG. 1A shows a perspective view of the film positioning device 100. FIG. 1B shows an exploded view of the film positioning device 100. The film positioning device 100 can act to feed and position film relative to a camera while coordinating image capture by the camera with the feeding and positioning of the film. Accordingly, the film positioning device 100 can provide rapid, coordinated film feeding and image triggering in a manner that can allow for images of the film to be captured in an efficient and convenient manner, thereby increasing the volume of film that can be captured by the camera.

The illustrated embodiment of the film positioning device 100 includes a housing 105. In this example, the housing 105 is made up of a number of components. For example, the housing 105 can be made up of a light chamber 115, a lower receptacle body 120, an upper receptacle body 125, and a mount support 130. These components can be assembled together to form the housing 105. In the example shown here, the lower receptacle body 120 is secured to the light chamber 115, the upper receptacle body 125 can be secured to the lower receptacle body 120, and the mount support 130 is secured to the upper receptacle body 125.

The housing 105 can define a film receptacle 110. The film receptacle 110 can be configured to receive film that is to be captured by a camera. The film receptacle 110 can include an inlet portion 111 and an outlet portion 112. In the illustrated example, the film receptacle is defined between the lower receptacle body 120 and the upper receptacle body 125. As will be described further herein, the film positioning device 100 can move film along the film receptacle in a direction from the inlet portion 111 to the outlet portion 112. Film at the film receptacle 110 can be aligned, by film positioning device 100, with the camera that is to capture images of the film. The film positioning device 100 can act to coordinate movement of the film along the film receptacle and alignment of the film with the camera such that images of the film can be captured and new portions of the film needing to be captured can be fed into position for image capture.

To position and move film along the film receptacle 110, the film positioning device 100 can include a feed mechanism 135. At least a portion of the feed mechanism 135 can be positioned at the film receptacle 110. The feed mechanism 135 can be configured to move film along the film receptacle 135. For example, an end of film can be placed at the inlet portion 111 and the feed mechanism 135 can be configured to move the film along the film receptacle 110 in a direction from the inlet portion 111 to the outlet portion 112.

The feed mechanism 135 can include a number of components configured to selectively impart a motive force on the film at the film receptacle 110. In the illustrated embodiment, the feed mechanism 135 includes a number of axles 136a, 136b, 136c, and 136d. The axles 136a-136d can be rotatably driven to cause a respective film contact element associated with each axle to move film along the film receptacle 110. As shown, each axle 136a-136d can extend through corresponding axle apertures 140 in the housing 105 such that each axle 136a-136d spans a width of the film receptacle 110. Accordingly, there can be two axle apertures 140 for each axle included as part of the feed mechanism 135. In the illustrated embodiment, the axle apertures 140 are defined in the lower receptacle body 120. Coordinated rotational movement amongst the axles 136a-136d can be facilitated using a chain 145 and/or one or more gears. As shown here, the chain 145 extends around an end portion of each the axles 136a, 136c and can, for instance, sit at a chain recess 146 on each of the axles 136a, 136c.

The film positioning device 100 can further include a controller. The controller can be configured to control various components of the film positioning device 100. The controller can be coupled to such components to receive an input signal therefrom and/or to convey an output signal thereto.

For example, the controller can be coupled to the feed mechanism 135. The controller can be configured to control the feed mechanism 135 to move film along the film receptacle 110. Based on control of the feed mechanism 135, the controller can be configured to output a camera actuation signal to cause a camera to capture an image of the film at the film receptacle 110.

The controller can be configured to coordinate the timing at which the camera actuation signal is output with movement of the film by the feed mechanism 135. For example, the controller may receive as input a feedback signal from the feed mechanism 135, and the controller can be configured to output the camera actuation signal based on this feedback signal from the feed mechanism 135. For instance, the controller can output the camera actuation signal when the feed mechanism 135 has stopped moving film and refrain from outputting the camera actuation signal when the feed mechanism 135 is moving film. Thus, in some cases, the controller can be configured to control the feed mechanism 135 to stop movement of the film along the film receptacle 110 and then, at that time, output the camera actuation signal. Outputting the camera actuation signal when the feed mechanism 135 has stopped moving the film may help to improve clarity of the image captured. Furthermore, in one embodiment, the controller is configured to output the camera actuation signal at a rate corresponding to a rate at which the feed mechanism 135 moves film along the film receptacle 110. For instance, the controller can be configured to control the feed mechanism 135 to move film along the film receptacle 110 at a known rate and can be configured to output the camera actuation signal at a frequency that is adapted to capture relevant portions of the film moving at the known rate as the film is moved along the film receptacle 110.

The film positioning device 100 can additionally include a light source 150. The light source 150 can be positioned to illuminate at least a portion of the film receptacle 110. For example, in the illustrated exploded view in FIG. 1B of the embodiment of the film positioning device 100, the light source 150 is positioned within the light chamber 115 of the housing 105. The light chamber 115 can be aligned with the film receptacle 110 such that the light source 150, within the light chamber 115, can be aligned with the film receptacle 110. Illuminating at least a portion of the film receptacle can be useful in improving the quality of film images captured using the film positioning device 100.

The film positioning device 100 can further include a camera mount 155. The camera mount 155 can be configured to removably receive at least a portion of a camera, such as a lens portion of the camera, and hold the camera portion in place relative to the film receptacle 110. The film positioning device 100 can include the camera mount 155 at a location on the housing 105 that is aligned with the film receptacle 110. The camera mount 155 can be configured to removably secure to the housing 105. In this way, different camera mounts 155 can be interchanged at the housing 105 to facilitate use of different types of cameras with the film positioning device 100. For example, a particular camera mount 155 may be adapted to hold the lens portion of a specific type (e.g., model) of camera and changed out with another camera mount 155 that is adapted to hold another, different lens portion of a different type of camera.

Figure 2:
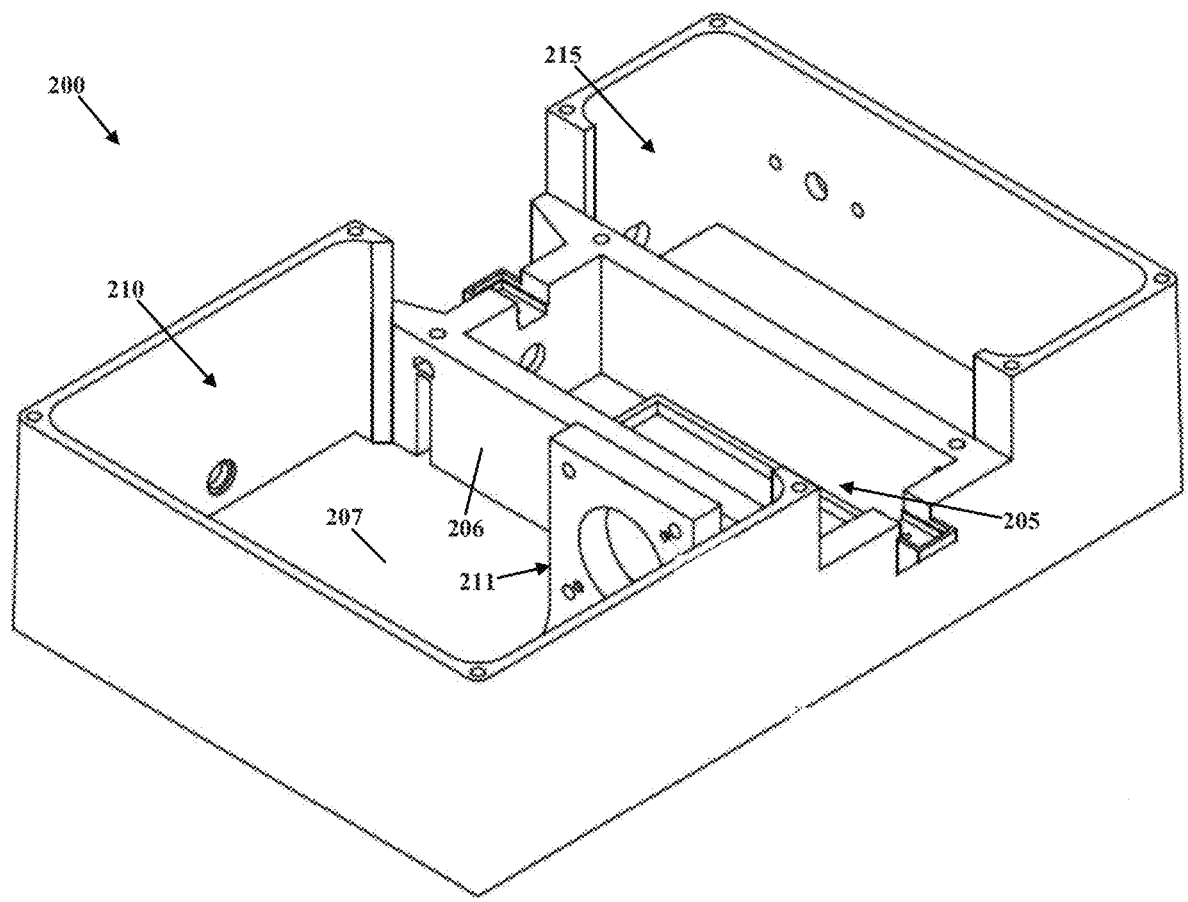
FIG. 2 is a perspective view of an embodiment of a support base at which the film positioning device of FIGS. 1A and 1B can be placed.

FIG. 2 shows a perspective view of an embodiment of a support base 200. In some embodiments, the film positioning device described herein can be placed at the support base 200. The support base 200 can include one or more portions for receiving different parts of the film positioning device. In the example shown here, the support base 200 includes a chamber portion 205 and stowing portions 210, 215. In some embodiments, the support base 200 may include one or more actuation members that can be The chamber portion 205 can be defined by walls 206 extending up from a base surface 207 of the support base 200. The walls 206 can separate the chamber portion 205 from the stowing portions 210, 215. In some embodiments, the chamber portion 205 can be configured to receive the light chamber portion of the film positioning device within the walls 206. In such embodiments, the walls 206 can be useful in preventing external light from creating electromagnetic noise in the illumination provided by the light source of the light chamber portion of the film positioning device.

The stowing portions 210, 215, shown here on opposite sides of the chamber portion 205, can be configured to receive one or more components of the film positioning device. For example, the stowing portion 210 can include a motor mount 211. The motor mount 211 can be configured to support in place a motor of the feed mechanism of film positioning device. Other components of the film positioning device that can be included in one or both of the stowing portions 210, 215 include one or more controllers, circuitry, and associated electrical wiring.

Figure 3A:
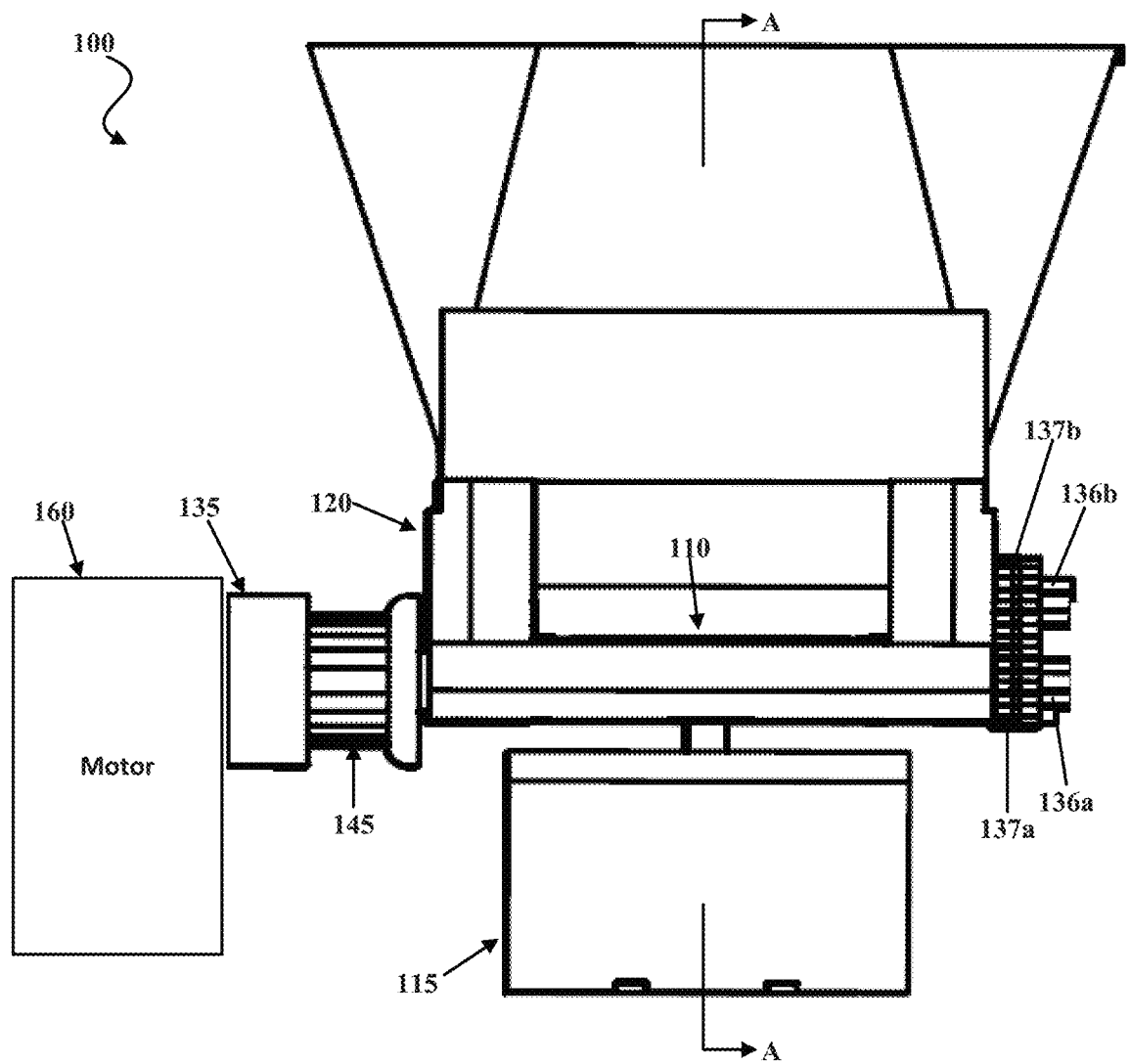
FIGS. 3A and 3B show one embodiment of a feed mechanism of the film positioning device of FIGS. 1A and 1B.
Figure 3B:
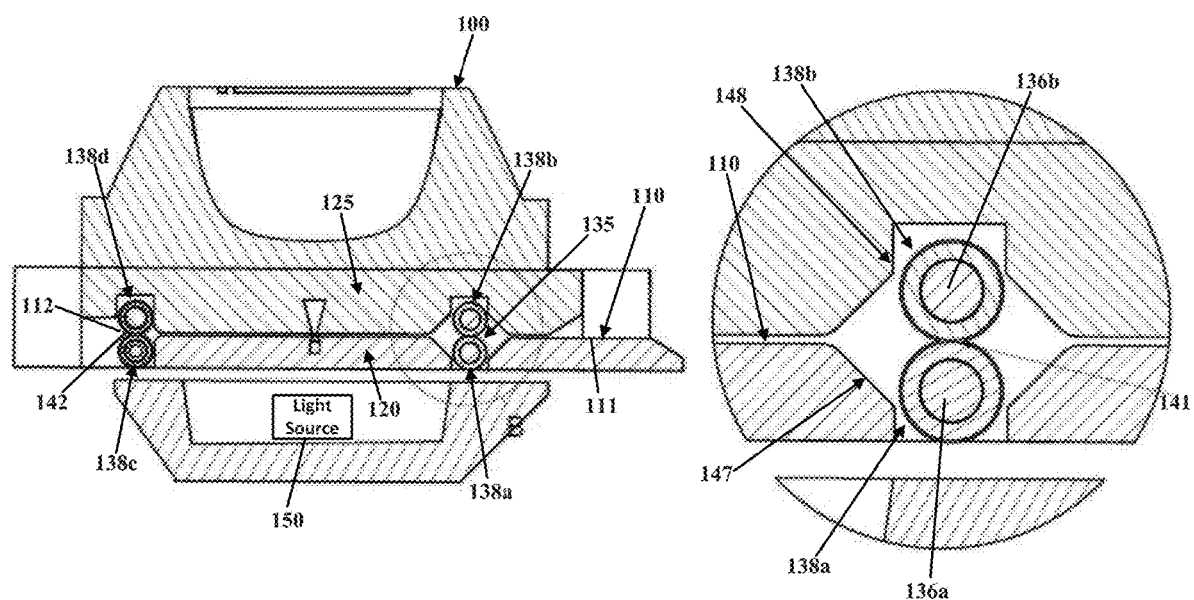

FIGS. 3A and 3B illustrate the feed mechanism 135 of the film positioning device 100. In particular, FIG. 3A shows a side elevational view of the feed mechanism 135 at the film positioning device 100, and FIG. 3B shows a cross-sectional view, taken along line A-A in FIG. 3A, of the feed mechanism 135 at the film positioning device 100.

As noted, the feed mechanism 135 can include axles 136a-136d. In addition, to rotatably drive the axles 136a-136d, the feed mechanism 135 can include a motor 160. Any of a variety of suitable motor types, such as a stepper motor, can be used. In this illustrated embodiment, the motor 160 is coupled to the axle 136a. The feed mechanism can be configured such that as the motor 160 rotatably drives the axles 136a, the other axles 136b-136d are also rotatably driven. For example, as noted, the chain 145 can extend around the axles 136a and 136c. In addition, a gear 137a can be coupled to the axles 136a and a gear 137b can be coupled to the axle 137b such that the gears 137a, 137b interface. In this way, as the motor 160 rotatably drives the axle 136a, the axle 136a can rotatably drive the axle 136b via the gears 137a, 137b. Likewise, as the motor 160 rotatably drives the axles 136a, the axle 136a can rotatably drive the axle 136c via the chain 145. The axles 136c and 136d can each be coupled to respective gears that interface, similar to the gears 137a, 137b of the axles 136a, 136b, such that as the axles 136c is rotatably driven via the chain 145, the axle 136c can rotatably drive the axle 136d via the interfacing, respective gears. Such an exemplary configuration is one way to coordinate consistent rotational movement of the axles 136a-136d such that each axles 136a-136d is moved as a same rotational speed.

The feed mechanism 135 can also include one or more film contact elements. The illustrated embodiment includes film contact elements 138a-138d, as shown in the cross-sectional view of FIG. 3B. Though not seen in the cross-section view shown here, film contact elements can be located in a same arrangement at an opposite side of the film receptacle (shown, e.g., in FIG. 4). In this example, the film contact elements 138a-138d are in the form of wheels, though in other embodiments the film contact elements 138a-138d can take a variety of suitable forms.

Each of the film contact elements 138a-138d can be positioned at the film receptacle 110. For instance, the lower receptacle body 120 can define a contact element recess 147 for each of the film contact elements 138a and 138c and the upper receptacle body 125 can define a contact element recess 148 for each of the film contact elements 138b and 138c. As shown here, a first film contact element 138a and a second film contact element 138b are aligned at a same location at the film receptacle 110. Likewise, a third film contact element 138c and a fourth film contact element 138d are aligned at a same location at the film receptacle 110. Each of the third and fourth film contact elements 138c, 138d is spaced from each of the first and second film contact elements 138a, 138b. A film feed slot 141 is defined between the first film contact element 138a and the second film contact element 138b. Likewise, a film feed slot 142 is defined between the third film contact element 138c and the fourth film contact element 138d. In the illustrated embodiment, each of the feed slots 141, 142 are aligned with (e.g., on a common plane with, at a common elevation with) the film receptacle 110. To facilitate such alignment, in the illustrated embodiment a rotational axis of each of the film contact elements 138a-138d is offset from the film receptacle 110.

The film contact elements 138a-138d can be configured to receive film at the feed slots 141, 142 and move the film through the feed slots 141, 142 and, thereby, along the film receptacle 110. For example, the first film contact element 138a can be coupled to the axle 136a, the second film contact element 138b can be coupled to the axle 136b, the third film contact element 138c can be coupled to the axle 136c, and the fourth film contact element 138d can be coupled to the axle 136d. As noted, the axle 136a can be coupled to the motor 160. As such, in this exemplary configuration, the first film contact element 138a at the axle 136a can be coupled to the motor 160. As the motor 160 rotatably drives the axle 136a, the other axles 136b-136d coupled to the axle 136a, via the chain 145 or gears, such as gears 137a, 137b, can also be rotatably driven. Since, as noted, each of the axles 136a-136d can be driven at a same rotational speed, each of the film contact elements 138a-138d can also be driven at a same rotational speed via the coupling of the gears or the chain between film contact elements 138a-138d.

Relative rotation of the pairs of film contact elements 138a, 138b and 138c, 138d can act to move film along the film receptacle 110. For instance, the motor 160 can be configured to rotatably drive the first film contact element 138a in a first rotational direction, while the second film contact element 138b can be configured to be driven in a second rotational direction that is opposite the first rotational direction. Such directional rotation of the first and second film contact elements 138a, 138b can act to move the film along the film receptacle 110 in a direction from the inlet portion 111 to the outlet portion 112. Likewise, the third film contact element 138c can be configured to be rotatably driven in the first rotational direction, while the fourth film contact element 138d can be configured to be driven in the second rotational direction that is opposite the first rotational direction. Such directional rotation of the third and fourth film contact elements 138c, 138d can act to move the film along the film receptacle 110 in a direction out from the outlet portion 112.

Figure 4:
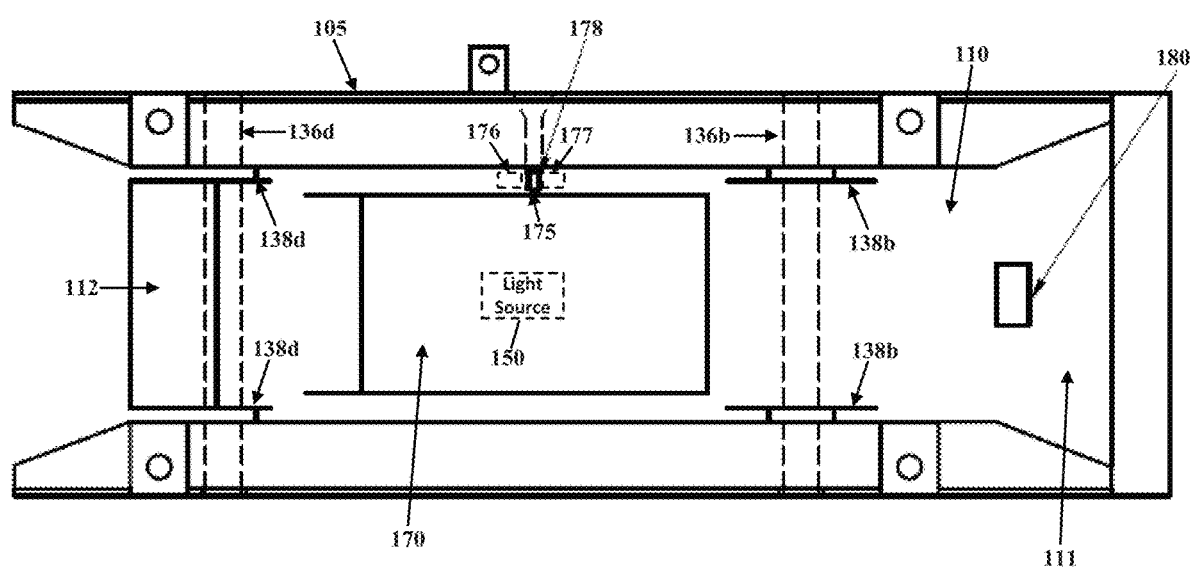
FIG. 4 is a top plan view of an embodiment of a portion of a housing defining a film receptacle of the film positioning device of FIGS. 1A and 1B.

FIG. 4 illustrates a top plan view of the film receptacle 110 of the film positioning device. As described previously, the film contact elements 138a, 138b, 138c, 138d of the feed mechanism can be configured to move film along the film receptacle 110 in a direction from the inlet portion 111 to the outlet portion 112. Based on control of the feed mechanism, the controller can output a camera actuation signal to cause a camera to capture an image of the film. For instance, the controller may output the camera actuation signal when the controller has caused the feed mechanism to position one or more frames of the film to be positioned at a particular location along the film receptacle 110.

In one example, the controller may output the camera actuation signal when the controller has caused the feed mechanism to position one or more frames of the film at a location along the film receptacle 110 where the one or more frames of film are illuminated by the light source 150. In the illustrated embodiment, the film receptacle 110 includes a diffuser 170. The diffuser 170 can be aligned with the light source 150 and may form a portion of the film receptacle surface. As such, the diffuser 170 can, at least in part, be positioned between the light source 150 and the film receptacle 110. The diffuser 170 can be configured to diffuse light emitted from the light source 150 such that light passing through the diffuser 170 to film at the film receptacle is at a substantially common intensity. The diffuser 170 can include one or more translucent materials that are configured to scatter light from the light source 150 and thereby convey light to the film receptacle 110 at a common intensity. In some examples, the diffuser 170 can be made up of multiple layers of such translucent material.

In some cases, it can be useful for the controller to output the camera actuation signal when the controller has caused the feed mechanism to position one or more frames of the film at the location of the diffuser 170 along the film receptacle. The presence of the light source 150 and associated diffuser 170 may help to improve the quality of the image of the film captured by the camera.

To assist the controller in positioning the film, via the feed mechanism, the film positioning device can include a film presence sensor 175. In the illustrated example, the film presence sensor 175 is positioned along the film receptacle 110 at a location aligned with the light source 150 and the diffuser 170. The film presence sensor 175 can be configured to detect the presence of film at the film receptacle 110. The film presence sensor 175 can be coupled to the controller, and the film presence sensor 175 can be configured to send a film presence signal to the controller. The controller can then use the film presence signal from the film presence sensor 175 to control movement of the film relative to the film receptacle 110. For example, the controller can be configured to control the feed mechanism, and thus the film contact elements 138a-138d, to move film along the film receptacle 110 based on the film presence signal. Likewise, the controller can be configured to control the feed mechanism, and thus the film contact elements 138a-138d, to stop movement of the film at the film receptacle 110 based on the film presence signal.

In one embodiment, the film presence sensor 175 includes an emitter 176 and a receiver 177. The emitter can be configured to emit light and the receiver can be configured to receive light. In the illustrated embodiment, the housing 105 defines a sensor aperture 178 at the film receptacle 110. The film presence sensor 175 (e.g., each of the emitter 176 and the receiver 177) can be positioned within the housing 105 and at (e.g., aligned with) the sensor aperture 178. In this embodiment, the film presence sensor 175 can generate the film presence signal based on an amount of light received at the receiver 177. For instance, the emitter 176 can emit light through the sensor aperture 178 and an amount of such light can be reflected back through the sensor aperture 178 and received at the receiver 177. In some cases, when the film is present at the location of the sensor aperture 178, the amount of light received at the receiver 177 can be different than the amount of light received at the receiver 177 when the film is not present at the location of the sensor aperture 178. As such, the amount of light received at the receiver 177 can be compared to a predetermined threshold to determine whether film is appropriately positioned at the film receptacle 110 (e.g., at the diffuser 170). Accordingly, the controller can be configured to control the feed mechanism when the amount of light received at the receiver 177 exceeds a predetermined threshold.

In certain embodiments, such as in the illustrated embodiment, the film positioning device can further include a second film presence sensor 180. The film presence sensor 180 can also be configured to detect the presence of film at the film receptacle 110. In the illustrated example, the film presence sensor 180 is positioned along the film receptacle 110 at a location closer to the inlet portion 111 than the light source 150 and diffuser 170. Thus, the film presence sensor 180 can be positioned upstream, in the direction of film travel, of the light source 150 and diffuser 170. The film presence sensor 180 can be coupled to the controller, and the film presence sensor 180 can be configured to send a film presence signal to the controller. In one example, the controller can use both the film presence signal from the film presence sensor 175 and the film presence signal 180 to control movement, or stop movement, of the film relative to the film receptacle 110.

Figure 5:
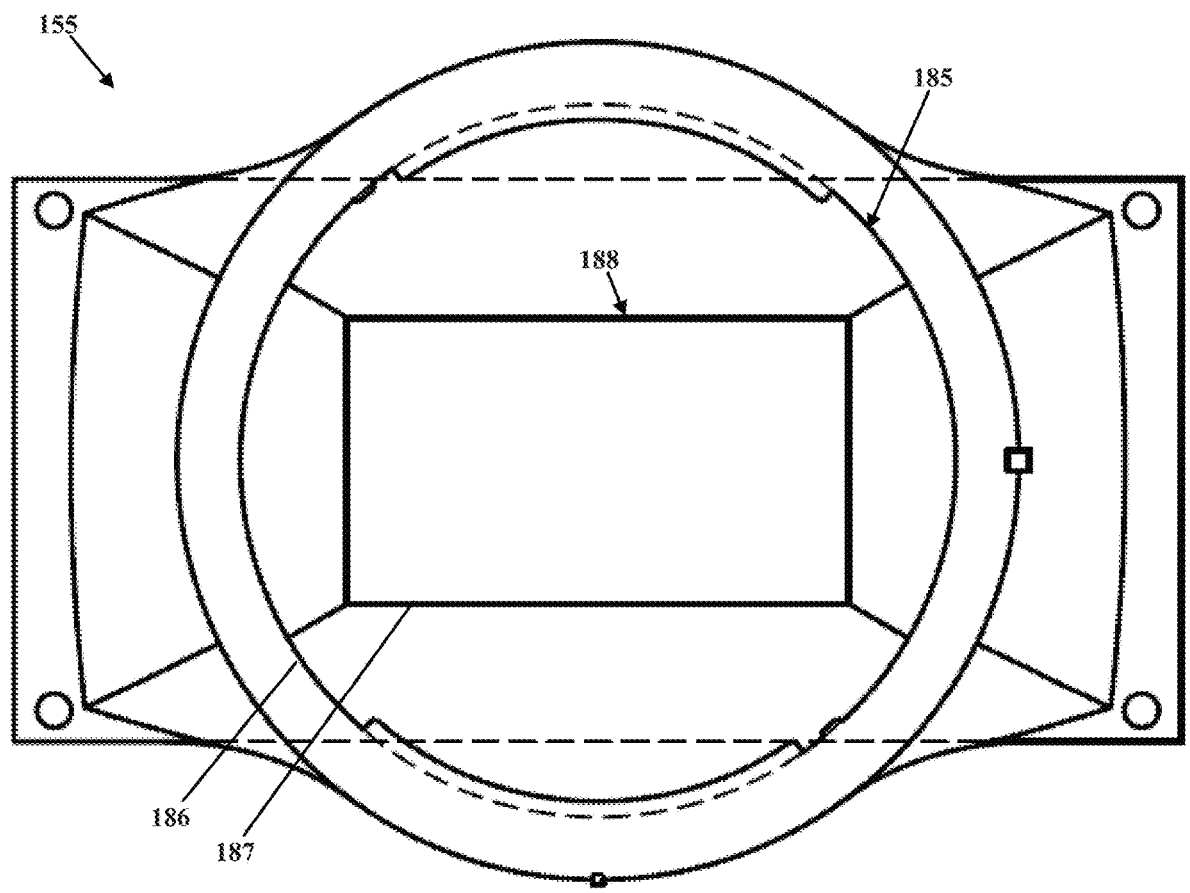
FIG. 5 is a top plan view of an embodiment of a camera mount of the film positioning device of FIGS. 1A and 1B.

FIG. 5 shows a top plan view of an embodiment of the camera mount 155 that can be included as part of the film positioning device. As noted previously, the camera mount 155 can be configured to removably receive at least a portion of a camera, such as a lens portion of the camera, and hold the camera portion in place relative to the film receptacle. A variety of different camera mounts can be interchanged at the film positioning device housing to facilitate use of different types of cameras with the film positioning device.

In the illustrated embodiment, the camera mount 155 includes a lens receiving opening 185. The lens receiving opening 185 can be configured to receive and hold a lens portion of a camera in place relative to the film receptacle. The lens receiving opening 185 can be defined by an upper surface 186 and a lower surface 187. The camera mount 155 can be secured to the housing of the film positioning device such that the lower surface 187 is closer to the film receptacle than the upper surface 186. In the illustrated embodiment, the lens receiving opening 185 defines a tapered width. In particular, the width of the lens receiving opening 185 at the upper surface 186 is greater than the width of the lens receiving opening 185 at the lower surface 187, with the width of the the lens receiving opening 185 reducing (e.g., at a constant rate) in a direction from the upper surface 186 toward the lower surface 187. Such a configuration can allow the lens receiving opening 185 to removably receive and hold a lens portion of a camera. As shown here, the lower surface 187 defines a imaging window 188. This imaging window 188 can be aligned with the film receptacle, for instance aligned with the lights source and/or diffuser. The imaging window 188 can allow the lens portion of the camera to take images of film therethrough.

Various camera mount configurations are within the scope of the present disclosure. The particulars of the camera mount can be configured to suit one or more particular aspects of a specific type of camera and camera mounts can be interchanged as appropriate for a type of camera desired to be used with the film positioning device. For example, the lens receiving opening 185 may vary, for instance in its width and/or taper, to configure the camera mount 155 for a specific type of camera.

Figure 6:
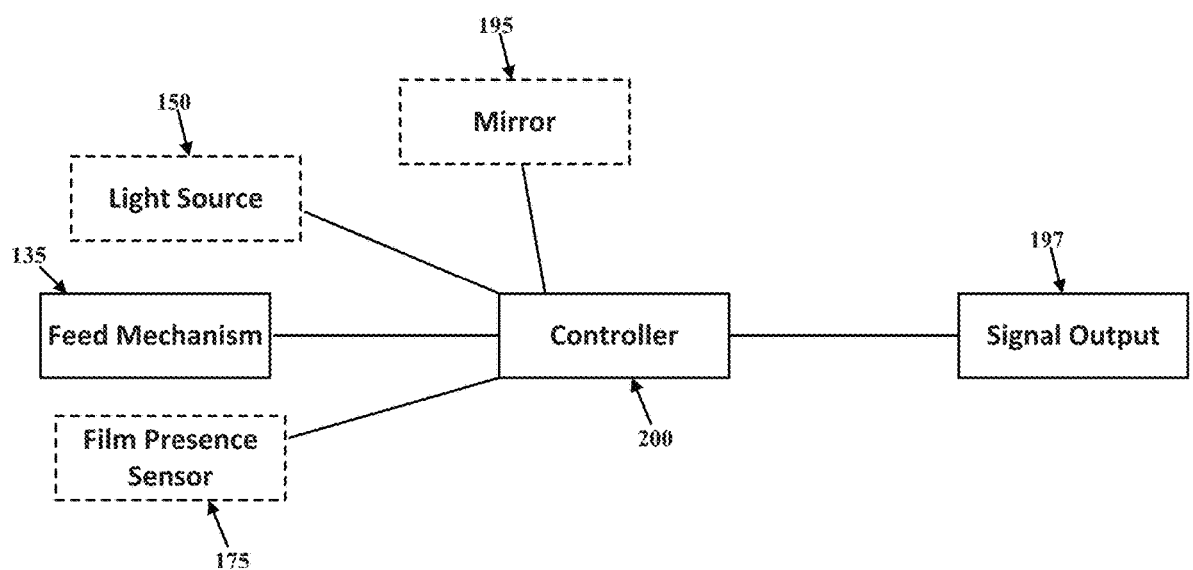
FIG. 6 is a block diagram of an embodiment of connected film positioning device components, including a controller and associated components coupled to the controller.

FIG. 6 shows a block diagram of an embodiment of connected film positioning device components, including the controller 200 and associated components coupled to the controller 200.

As shown here, the controller 200 can be coupled to a number of film positioning device components. The controller 200 can receive input from one or more such components and use this input to control that component and/or one or more other components of the film positioning device.

In the illustrated embodiment, the controller 200 is coupled to the feed mechanism 135. As described previously, the controller 200 can be configured to control the feed mechanism 135 to move film along the film receptacle. Also in the illustrated embodiment, the controller 200 is coupled to the film presence sensor 175. As described previously, the controller 200 can be configured to receive a film presence signal from the film presence sensor 175 and use the film presence signal to control the feed mechanism 135 to move, or stop movement of, film along the film receptacle.

In one embodiment, the film positioning device can include a user input mechanism that is coupled to the controller 200. For instance, as one example, the user input mechanism could be one or more buttons (e.g., first and second direction arrow buttons) located on the housing of the film positioning device. The user input mechanism can be configured to allow a user to selectively adjust the positioning of film at the film receptacle of the film positioning device. For example, when the user input mechanism is actuated by a user, the user input mechanism can send a positioning adjustment signal to the controller 200, and the controller 200 can use the positioning adjustment signal from the user input mechanism to control the feed mechanism 135 to adjust the position of the film at the film receptacle in a manner corresponding to the positioning adjustment signal. In another example, the user input mechanism can be configured to receive user input corresponding to a confirmation of appropriate film positioning at the film receptacle and convey this positioning confirmation to the controller 200. In this example, the controller 200 may wait to receive the positioning confirmation from the user input mechanism before further controlling the feed mechanism 135 to adjust the positioning of the film at the film receptacle.

As shown here, the controller 200 can be coupled to a signal output 197. The signal output can be configured to output one or more types of signals, including control commands and data packets, to an external device. For example, the controller 200 can be configured to use the signal output 197 to output the camera actuation signal to cause a camera to capture an image of the film. In one embodiment, the signal output 197 can be a wireless transmitter included at the film positioning device and coupled to the controller 200. In such embodiment, the controller 200 can be configured to wirelessly output the camera actuation signal to the camera via the wireless transmitter signal output 197. The wireless transmitter can be any type of suitable wireless transmitter, including Bluetooth and WiFi. In another embodiment, the signal output 197 can be a port at the camera positioning device configured to receive a wired connection to an external device, such as the camera.

The signal output 197 can be used by the controller to communicate with other types of external devices, such as a remote computing device (e.g., personal computer, tablet, handheld device). For example, in one embodiment, the film positioning device can be in two-way communication with a remote computing device via the signal output 197. The film positioning device can send to the remote computing device information relating to any of the one more various components described herein and receive commands from the remote computing device. For instance, the remote computing device may instruct the film positioning device to use the feed mechanism to adjust the position of the film based on a sampling of images received from the camera being used with the film positioning device. In some embodiments, the camera being used with the film positioning device can send captured digital images to the remote computing device and the remote computing device can store these images in an image data base.

As shown in the illustrated embodiment, the controller 200 can be coupled to the light source 150. In one embodiment, the controller 200 can be configured to control the light source 150. For example, the controller 200 can be configured to turn the light source 150 on and off, in some cases using input received from another component or external device to then turn the light source 150 on or off.

In one embodiment, the film positioning device can include a mirror 195. The mirror 195 can be located at the housing of the film positioning device. In one embodiment, the mirror 195 can be configured to move relative to the film receptacle. In another embodiment, the mirror 195 can be stationary relative to the film positioning device housing.

For example, when included in certain embodiments, the mirror 195 can be used to convey reflections of the film, at the film receptacle, to the camera positioned at the camera mount. This may be useful in instances where the film has images thereon that are arranged in a manner that be difficult for the camera at the camera mount to appropriately capture each of. As such, the mirror 195 can be arranged at the housing so as to convey a reflection of film through the imaging window of the camera mount.

As noted, in some embodiments the mirror 195 can be configured to move relative to the film receptacle. As shown in FIG. 6, the controller 200 can be coupled to the mirror 195 and the controller 200 can be configured to move the mirror 195 relative to the film receptacle. For example, the controller 200 can be configured to move the mirror 195 along a direction parallel to a longitudinal length of the film receptacle (e.g., perpendicular to the width of the film receptacle). In another example, the controller 200 can be configured to move the mirror 195 along a direction parallel to a width of the film receptacle (e.g., perpendicular to the longitudinal length of the film receptacle). In one case, the controller 200 can be configured to move the mirror 195 along at least two different axes, such as along each of the direction parallel to a longitudinal length of the film receptacle and direction parallel to a width of the film receptacle.

In certain embodiments, the controller 200 can be configured to change an angular position of the mirror 195, such as tilting or pivoting the mirror 195, in addition to controlling movement of the mirror 195.

In one embodiment, the controller 200 can coordinate movement of the mirror 195 with control of the feed mechanism 135. For example, the controller may actuate the feed mechanism 135 to move film along the film receptacle and then use this information relating to actuation of the feed mechanism 135 to determine and implement one or both of a distance of mirror movement and a direction of mirror movement.

Various examples have been described with reference to certain disclosed embodiments. The embodiments are presented for purposes of illustration and not limitation. One skilled in the art will appreciate that various changes, adaptations, and modifications can be made without departing from the scope of the invention.

What is claimed is:

1. A film positioning device comprising:
a housing defining a film receptacle, the housing including a mount support;
a feed mechanism positioned at the film receptacle, wherein the feed mechanism is configured to move film along the film receptacle; and
a controller coupled to the feed mechanism, wherein the controller is configured to control the feed mechanism to move film along the film receptacle, and wherein, based on control of the feed mechanism, the controller is configured to output a camera actuation signal to cause a camera to capture an image of the film,
wherein the mount support is configured to removably secure a first camera mount to the housing, the first camera mount including an upper surface, a lower surface that defines an imaging window, and a lens receiving opening extending from the upper surface to the imaging window, the lens receiving opening having a width that reduces along a length from the upper surface toward the lower surface to configure the first camera mount to receive a lens portion of a first type of camera and hold the lens portion of the first type of camera in place relative to the film receptacle.

2. The device of claim 1, wherein the controller is configured to output the camera actuation signal at a rate corresponding to a rate at which the feed mechanism moves film along the film receptacle.

3. The device of claim 1, wherein the controller is configured to control the feed mechanism to stop movement of film along the film receptacle and then output the camera actuation signal.

4. The device of claim 1, wherein the controller receives a feedback signal from the feed mechanism, and wherein the controller is configured to output the camera actuation signal based on the feedback signal from the feed mechanism.

5. The device of claim 1, wherein the feed mechanism comprises:
a motor; and
a first film contact element coupled to the motor, the first film contact element positioned at the film receptacle.

6. The device of claim 5, wherein the feed mechanism further comprises:
a second film contact element positioned at the film receptacle,
wherein the motor is configured to rotatably drive the first film contact element in a first rotational direction, and wherein the second film contact element is configured to be driven in a second rotational direction that is opposite the first rotational direction.

7. The device of claim 6, wherein the feed mechanism further comprises:
a third film contact element positioned at the film receptacle,
wherein the first film contact element and the second film contact element are aligned at a same location at the film receptacle, wherein the third film contact element is spaced from each of the first film contact element and the second film contact element, wherein the third film contact element is coupled to a gear, and wherein the gear is coupled to the first film contact element such that the gear rotatably drives the third film contact element at a same rotational speed as the first film contact element.

8. The device of claim 1, wherein the film receptacle has an inlet portion and an outlet portion, and wherein the feed mechanism is configured to move the film along the film receptacle in a direction from the inlet portion to the outlet portion.

9. The device of claim 1, further comprising:
a light source positioned to illuminate at least a portion of the film receptacle.

10. The device of claim 9, wherein the housing further defines a light chamber aligned with the film receptacle, and wherein the light source is positioned within the light chamber of the housing.

11. The device of claim 9, further comprising:
a light diffuser positioned between the light source and the film receptacle.

12. The device of claim 11, wherein the light diffuser comprises a translucent material, where the translucent material is configured to scatter light emitted from the light source and thereby convey light to the film receptacle at a common intensity.

13. The device of claim 1, further comprising:
a film presence sensor configured to detect the presence of film at the film receptacle, wherein the film presence sensor is coupled to the controller, and wherein the film presence sensor is configured to send a film presence signal to the controller.

14. The device of claim 13, wherein the controller is configured to control the feed mechanism to move film along the film receptacle based on the film presence signal.

15. The device of claim 14, wherein the film presence sensor comprises an emitter configured to emit light and a receiver configured to receive light, wherein the film presence signal is generated based on an amount of light received at the receiver, and wherein the controller is configured to control the feed mechanism when the amount of light received at the receiver exceeds a predetermined threshold.

16. The device of claim 13, wherein the housing further defines a sensor aperture at the film receptacle, and wherein the film presence sensor is positioned within the housing at the sensor aperture.

17. The device of claim 1,
wherein the mount support is configured to removably secure a second camera mount to the housing, the second camera mount including an upper surface, a lower surface that defines an imaging window, and a lens receiving opening extending from the upper surface to the imaging window, the lens receiving opening having a width that reduces along a length from the upper surface toward the lower surface to configure the second camera mount to receive a lens portion of a second type of camera and hold the lens portion of the second type of camera in place relative to the film receptacle.

18. The device of claim 1, further comprising:
a wireless transmitter coupled to the controller, wherein the controller is configured to wirelessly output the camera actuation signal to the camera via the wireless transmitter.

19. A film positioning device comprising:
a housing defining a film receptacle;
a feed mechanism positioned at the film receptacle, wherein the feed mechanism is configured to move film along the film receptacle;
a controller coupled to the feed mechanism, wherein the controller is configured to control the feed mechanism to move film along the film receptacle, and wherein, based on control of the feed mechanism, the controller is configured to output a camera actuation signal to cause a camera to capture an image of the film; and
a mirror located at the housing and configured to move relative to the film receptacle.

20. The device of claim 19, wherein the mirror is coupled to the controller, and wherein the controller is configured to move the mirror along at least two different axes.

\* \* \* \* \*